United States Patent
Bork et al.

(10) Patent No.: US 12,272,277 B1
(45) Date of Patent: Apr. 8, 2025

(54) SELECTIVELY OPERATIONAL HEADS-UP DISPLAY SYSTEM FOR A VEHICLE

(71) Applicant: FCA US LLC, Auburn Hills, MI (US)

(72) Inventors: Michael A. M. Bork, Troy, MI (US); Victoria E Koronkiewicz, Ferndale, MI (US); Ian J Komisak, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/422,251

(22) Filed: Jan. 25, 2024

(51) Int. Cl.
  *G09G 3/00* (2006.01)
  *B60K 35/234* (2024.01)
  *B60K 35/81* (2024.01)

(52) U.S. Cl.
  CPC .......... *G09G 3/001* (2013.01); *B60K 35/234* (2024.01); *B60K 35/81* (2024.01); *G09G 2380/10* (2013.01)

(58) Field of Classification Search
  None
  See application file for complete search history.

(56) References Cited

U.S. PATENT DOCUMENTS

| | | | |
|---|---|---|---|
| 5,381,267 A | 1/1995 | Woody et al. | |
| 10,996,481 B1* | 5/2021 | Wells | B60K 35/90 |
| 11,975,609 B1* | 5/2024 | Austin | B60K 35/00 |
| 2007/0183055 A1* | 8/2007 | Maliah | G02B 27/0149 |
| | | | 359/632 |
| 2015/0367859 A1* | 12/2015 | Roth | G02B 27/01 |
| | | | 701/36 |
| 2018/0335633 A1* | 11/2018 | Naruse | G06F 3/013 |
| 2021/0023914 A1* | 1/2021 | Warey | B60J 1/06 |
| 2021/0026134 A1* | 1/2021 | Harkins | B60K 35/60 |
| 2021/0341736 A1* | 11/2021 | Watanabe | B60K 35/28 |

* cited by examiner

*Primary Examiner* — Andre L Matthews
(74) *Attorney, Agent, or Firm* — Jeremy J. Klobucar

(57) ABSTRACT

In at least some implementations, a vehicle has a windshield, a display transmitter having an output through which light is emitted onto at least part of the windshield, a sensor responsive to the one or both of a position of the windshield and the presence of a reflective surface associated with the windshield and onto which light is emitted from the display transmitter, and a controller. The controller is coupled to the display transmitter and is operable to change a mode of the display transmitter when the sensor does not detect the windshield in a home position or when the sensor does not detect the presence of the reflective surface.

17 Claims, 3 Drawing Sheets

US 12,272,277 B1

SELECTIVELY OPERATIONAL HEADS-UP DISPLAY SYSTEM FOR A VEHICLE

FIELD

The present disclosure relates to a heads-up display for a vehicle.

BACKGROUND

Some vehicles include a display at or near a windshield of the vehicle, arranged so that a driver can see information provided on the display while also looking through the windshield and controlling the vehicle. Some of these displays require a surface of the windshield to reflect the light so it is visible to the driver and does not simply pass through the windshield.

SUMMARY

In at least some implementations, a vehicle has a windshield, a display transmitter having an output through which light is emitted onto at least part of the windshield, a sensor responsive to the one or both of a position of the windshield and the presence of a reflective surface associated with the windshield and onto which light is emitted from the display transmitter, and a controller. The controller is coupled to the display transmitter and is operable to change a mode of the display transmitter when the sensor does not detect the windshield in a home position or when the sensor does not detect the presence of the reflective surface.

In at least some implementations, the windshield is movable from a first position in which the windshield covers a windshield opening defined by one or more structural members of the vehicle, and to a second position in which the windshield does not cover the windshield opening. In at least some implementations, the windshield is pivoted to the vehicle and rotated about a pivot axis relative to the vehicle and to and between the first position and the second position.

In at least some implementations, the sensor is a switch and wherein the windshield has a first position in which the windshield covers a windshield opening defined by one or more structural members of the vehicle, and wherein the switch is in a first state when the windshield is in the first position and the switch is in a second state when the windshield is not covering the windshield opening.

In at least some implementations, the sensor is a proximity sensor that detects the presence of the windshield. In at least some implementations, the proximity sensor provides data from which a distance of the windshield from the sensor can be determined. In at least some implementations, the display transmitter is carried by a housing and the proximity sensor is located in or on the housing. In at least some implementations, a characteristic of the emitted light is controlled as a function of the distance. In at least some implementations, the characteristic is a focal length or throw distance of the display transmitter.

In at least some implementations, the display transmitter is arranged to emit light onto at least a portion of the reflective surface so that graphics provided by the display transmitter are viewable by a person within the vehicle.

In at least some implementations, the proximity sensor emits light or sound and the proximity sensor includes a receiver that received reflections of the light or sound.

In at least some implementations, a method of controlling a heads-up display in a vehicle includes: a) determining the presence of a windshield within a windshield opening of a vehicle, and permitting operation of a display transmitter; or b) determining that the windshield is not present within the windshield opening and then preventing operation of the display transmitter.

In at least some implementations, preventing operation of the display transmitter is accomplished by not providing power to the display transmitter.

In at least some implementations, determining that a windshield is present or that a windshield is not present is accomplished with a controller and a sensor communicated with the controller, where the sensor is responsive to the position of the windshield. In at least some implementations, the sensor includes an emitter that emits light or sound, and the sensor includes a receiver that receives reflected light or sound to determine the presence of the windshield. In at least some implementations, the controller is coupled to the display transmitter and the controller provides content for display by the display transmitter when the display transmitter is operational.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
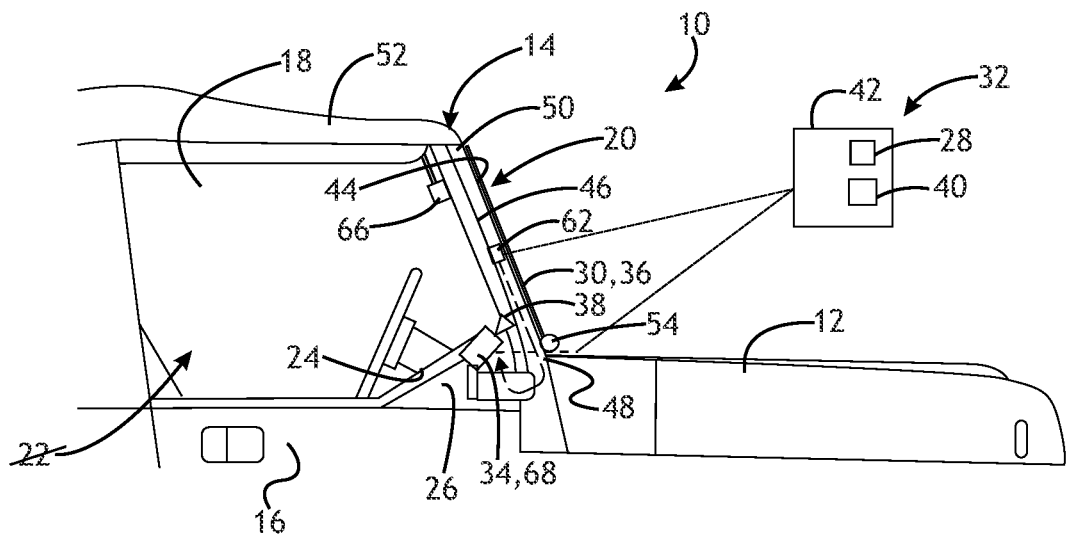
FIG. 1 is a partial side view of a vehicle including a Heads-Up Display (HUD) system, and showing a windshield in a first position.

Referring in more detail to the drawings, FIG. 1 illustrates a vehicle 10 that may be of any type and size to transport a driver and optionally one or more passengers or cargo. The vehicle 10 includes a body 12 that includes a frame having various support structures 14, doors 16, windows 18 and a windshield 20. The doors 16, windows 18 and windshield 20, along with various body components, define an interior of the vehicle 10 including a passenger compartment 22 or cabin in which vehicle occupants are received in use of the vehicle 10.

The vehicle 10 may have one or more displays by which information is provided to the driver and/or other vehicle occupants. A display may be part of an instrument panel 24 or a dashboard 26 and by which various information is provided to the driver, such as information relating to a Human-Machine Interface (HMI) (e.g. infotainment system 28) which enables control of climate controls, radio or other audio systems, vehicle 10 settings and the like. The display 30 may be part of a so-called Heads-Up Display (HUD) system 32, where the display 30 may be part of or adjacent to a vehicle windshield 20 located at a front of the passenger compartment 22 of the vehicle 10 and through which a driver looks to see the road and environment in front of the vehicle 10. With a HUD system 32, a driver can see displayed information without having to look away from the road, or with having to only minimally divert their eyes from their normal view through the windshield 20.

Figure 5:
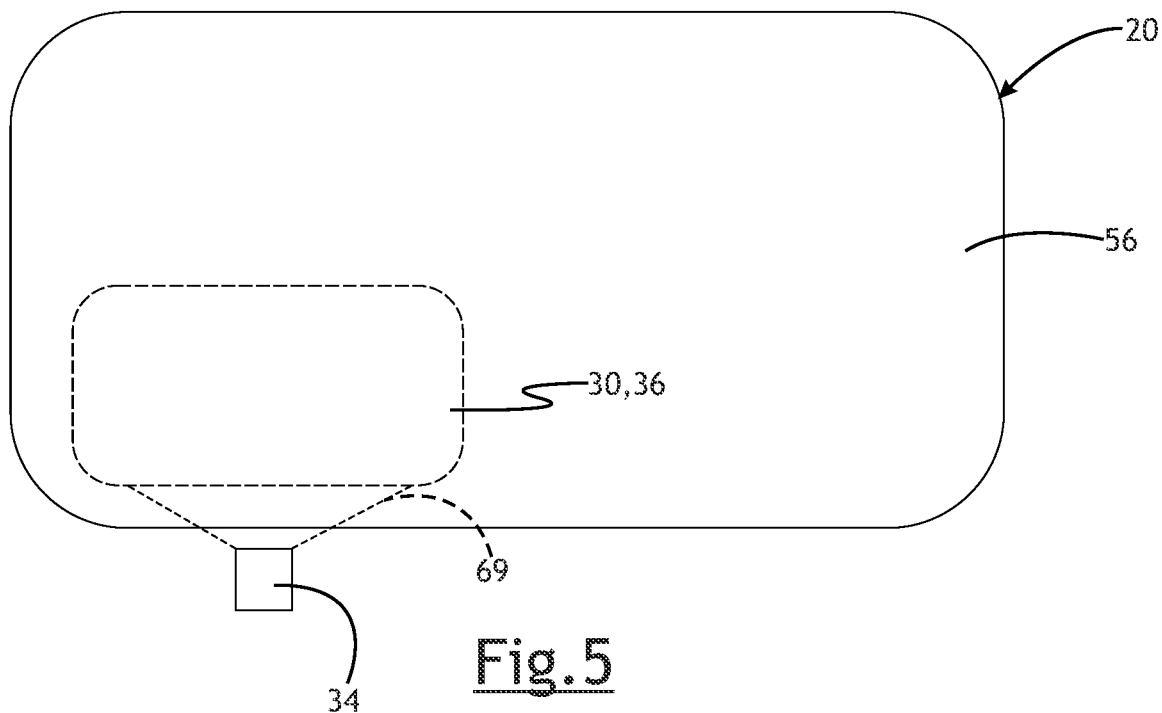
FIG. 5 is a front view of a windshield showing an area with a reflective surface for display of content from the display transmitter.

To better function with a HUD system 32, the windshield 20 may have at least a portion that is constructed and arranged to provide an area on which content provide from a display transmitter 34 of the HUD system 32 can be viewed from within the vehicle 10. As shown in FIG. 5, the area may be part or all of the windshield 20 and may include a material, layer or substrate providing a reflective surface 36 that is on or embedded within the windshield 20, in known manner, and which is arranged to receive and reflect light transmitted onto the reflective surface 36 for viewing by the driver.

To provide a desired display of content on the windshield 20, the HUD system 32 also includes a display transmitter 34. The display transmitter 34 has an output 38 (e.g. a lens or port) from which light is emitted toward the windshield 20, which may be called a light emitter or projector. Any suitable light generation and emitting device or devices may be used to provide a desired output. By way of examples without limitation, the display transmitter may include cathode-ray tube, LCD, LED, Vertical Cavity Surface Emitting Laser, other laser or other light source, and a suitable lens.

To control the content displayed by the HUD system 32, the display transmitter 34 is communicated with a controller 40 which may define or be part of a vehicle control system 42. The control system 42 may be comprised of or include one or more vehicle electronic module(s) installed in the vehicle 10. Each module may include some combination of or access to a data storage unit (e.g. memory), an electronic control unit which may include one or more controllers or processors, and programs or algorithms or instructions stored in the memory/data storage unit. Vehicle electronic module may be a telematics control module (TCM), a body control module (BCM), an infotainment control module, or any other suitable module. The infotainment control module 30 may control, among other things, instrument panel and other vehicle displays which may include the HUD 30, audio and video inputs and outputs, navigation system, and other components and systems as is known. It is not necessary for the preceding units to be packaged in a single vehicle electronic module, rather, they could be distributed among multiple vehicle electronic modules, they could be stand-alone units, they could be combined or integrated with other units or devices, or they could be provided according to some other configuration. The control system 42 and controller 40 are not limited to any particular architecture, infrastructure or combination of elements.

In order to perform the functions and desired processing set forth herein, as well as the computations therefore, the control system 42 or controller 40 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 40 may include input signal processing and filtering to enable accurate sampling and conversion or acquisitions of such signals from communications interfaces and sensors.

As used herein the terms control system 42 or controller 40 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. Memory, as used herein, can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device or processor(s), and executable programs and algorithms and data and information for these things.

In at least some implementations, the controller 40 may be part of the vehicle infotainment/HMI system 28 and may be communicated with other controllers or control modules in the vehicle 10 and various sensors like a vehicle speed sensor, location sensor, temperature sensor and the like. In this way, content can be displayed to the driver from the HUD system 32 to assist the driver in navigating the vehicle, or otherwise provide information to the driver. Representative content may include an indication of vehicle speed, vehicle direction of travel, vehicle location, map/GPS data, temperature/weather information, and information about a radio station or other audio source currently in use, among other things.

Figure 2:
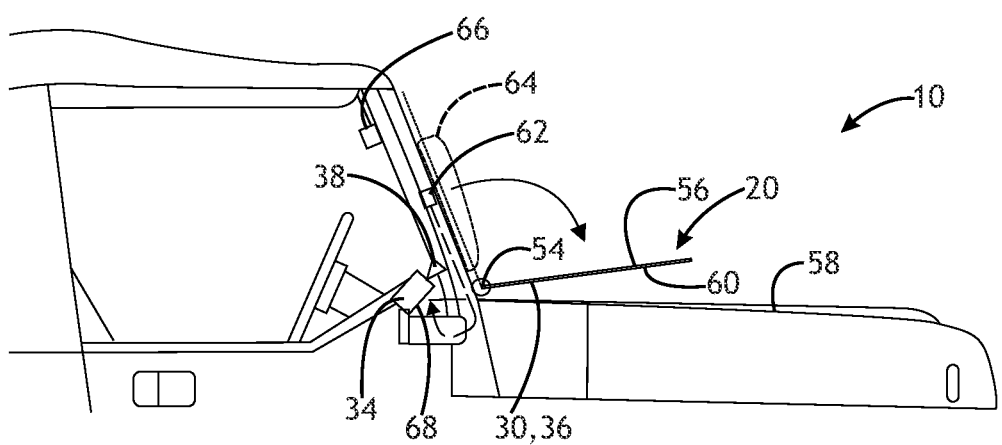
FIG. 2 is a view similar to FIG. 1 showing the windshield in a second position.
Figure 3:
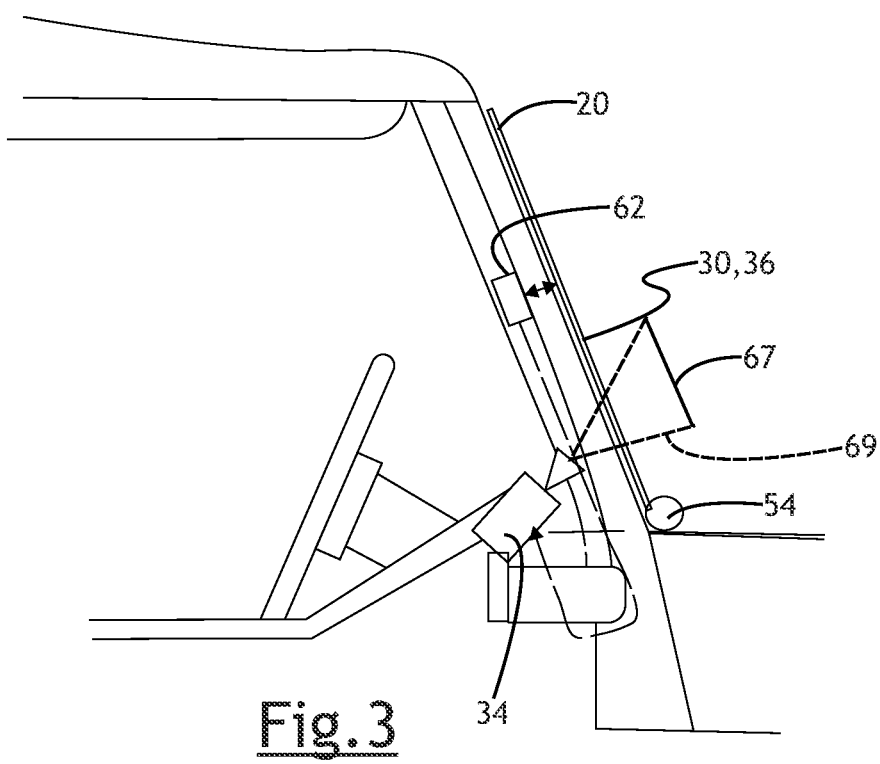
FIG. 3 is a partial side view showing the windshield in the first position and a display transmitter prior to an adjustment of its output.
Figure 4:
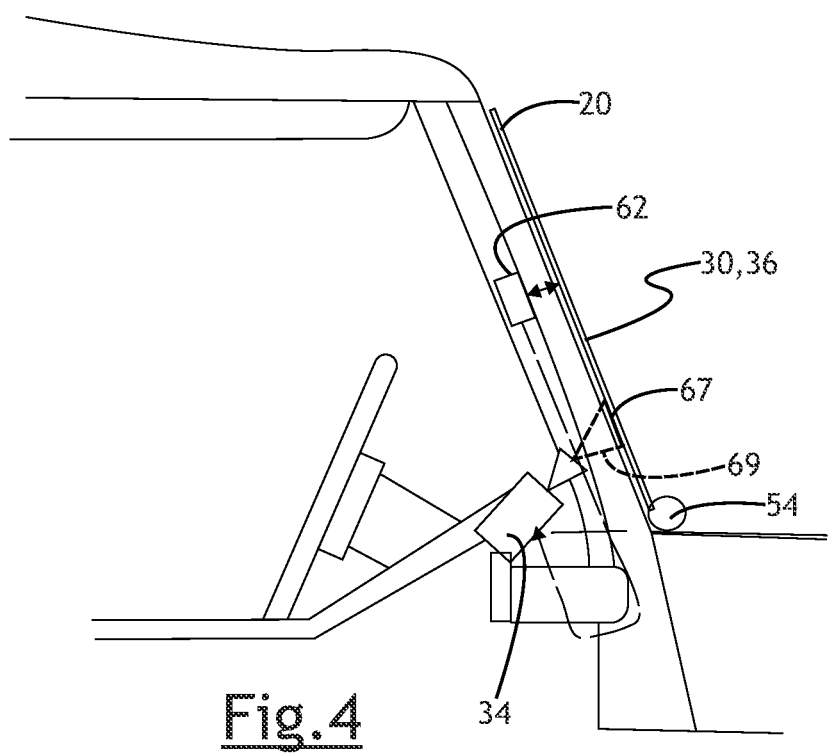
FIG. 4 is a view similar to FIG. 3 showing the display transmitter with its output adjusted as a function of the windshield location.

In at least some implementations, the windshield 20 is movable relative to the vehicle 10 between a home position or first position, shown in FIGS. 1 and 3, and a second position, shown in FIGS. 2 and 4. In the home/first position, the windshield 20 covers a windshield opening 44 defined by one or more structural members of the vehicle 10. In the example shown, the windshield opening 44 is defined by spaced apart pillars 46, a lower structural member 48 and an upper structural member 50 which may also support and be connected to the vehicle roof 52. In the first position, the windshield 20 may be secured and sealed to surfaces of the structural member(s) to provide a wind and water tight interface between them, and the windshield 20 may fully cover the windshield opening 44.

In the second position, the windshield 20 does not cover the windshield opening 44 and at least part of and up to all of the windshield opening 44 is not obstructed by the windshield 20. For example, the windshield 20 may be moved to a second position in which the windshield 20 is generally parallel to and received over part of the vehicle hood 58. In at least some implementations, the windshield 20 may be coupled to the vehicle 10 with a pivot mount 54 adjacent to a lower edge of the windshield 20 so that the windshield 20 rotates relative to the windshield opening 44 about the pivot mount 54. In this example, in the second position, as shown in FIG. 2, an inner surface 56 of the windshield 20, which defines part of the passenger compartment 22, may face away from the vehicle hood 58 and the opposite, outer surface 60 of the windshield 20 may be received adjacent to and facing the vehicle hood 58. Suitable latches or fasteners may releasably hold the windshield 20 in the first position and/or the second position, as desired. The windshield 20 may also or instead be removable from the vehicle 10 in which case the second position can be defined by the windshield 20 being separate from and not coupled to the vehicle 10 near the windshield opening 44. Such a removable windshield 20 may be adapted for reinstallation on the vehicle 10, in at least some implementations.

In the second position of the windshield 20, the reflective surface 36 on which the HUD 30 is provided, is not in a position in which the display transmitter 34 can provide a suitable image. In some implementations, in the second position, the windshield 20 is removed from the path of light emitted from the display transmitter 34 such that no display on the windshield 20 is possible. In at least these implementations, continued operation of the display transmitter 34, and the controller 40 insofar as it is operated to control the display transmitter 34, is a waste of energy. Further, undesired emission of light could be distracting or otherwise bothersome to people outside of the vehicle 10.

To enable selective operation of the HUD system 32 only when the windshield 20 is able to provide a surface for the display, e.g. when the windshield 20 is in the first position, the HUD system 32 may include a sensor 62 that is responsive to the position of the windshield 20. The sensor 62 may determine the presence of the windshield 20 within an effective area 64 (FIG. 2) in which the HUD can be provided for viewing, a presence of the reflective surface 36 within an effective area 64, a presence of another part of the windshield detectable by the sensor, such as a frame or peripheral portion of the windshield (e.g. the frit or other material on the windshield) not including the reflective surface, and/or a distance or location of the windshield 20 or reflective surface 36 relative to the sensor 62. Representative sensors 62 include switches the state of which (e.g. open/closed) is different when the windshield 20 is in the first position than when the windshield 20 is not in the first position. By way of a non-limiting example, a normally open, mechanical switch can be actuated from the open state and moved to the closed state when the windshield 20 is in the first position, and the HUD system 32 is operational only when the switch is closed. Of course, other switches and devices may be used to achieve similar function.

In at least some implementations, the sensor 62 be a proximity sensor and can be optical (photoelectric, infrared, a camera, etc.), inductive, capacitive, ultrasonic, or magnetic in nature, by way of examples. The proximity sensor 62 can be located within the passenger compartment 22, for example on or near a pillar 46, a rearview mirror 66 on or near the windshield 20, or on or near the dashboard and have an effective area sufficient to enable the sensor 62 to detect the presence of the windshield 20 (e.g. a frame or peripheral portion thereof outboard of the display area of the HUD) and/or the reflective surface 36 of the windshield 20. If the windshield 20 and/or reflective surface 36 is moved out of the effective area, the sensor 62 can provide an output indicative of this to the controller 40, such as via a CAN bus or LIN bus. The controller 40 can then turn off the display transmitter 34 and/or the HUD system 32 generally.

In the case of HUD projectors (i.e. display transmitters 34) with adjustable lenses 38 or other adjustable features that permit a change in a characteristic of the emitted light, for example the focal length or optical throw distance (i.e. the distance from the output 38 to the projection display surface), a proximity sensor 62 can be used to provide distance measurements (or other output from which distance can be determined) to the controller 40 which can then adjust the light outputted from the display transmitter 34 if needed, as a function of the data from the sensor 62. Doing this can improve image clarity and presentation of graphics and the like of a desired scale and proportions. For example, the sensor data can be compared to a nominal value or values, which may include a range or tolerance band, and which can be stored in memory accessible by the controller 40. Any resulting difference between the measured/determined distance and the nominal values/distance, can be used to correct the throw distance or focus of the projector 34. This is shown diagrammatically in FIGS. 3 and 4, in which a focal point 67 of projected light from the display transmitter is shown by a broken line polygon 69. In FIG. 3, the focal point is beyond the windshield, so the throw distance is too great. In FIG. 4, the throw distance has been lessened and the focal point is at the windshield to provide an improved graphic display, In at least some implementations, the display transmitter 34 may be received within a housing 68 or installed in or on the dashboard of the vehicle 10 with a cover provided, and the sensor 62 may be located with the display transmitter housing 68 or cover. The sensor 62 may include an emitter from which light or sound is emitted, and a receiver to receive reflected light or sound to thereby determine one or both of the presence of the windshield 20/reflective surface 36 and the distance from the sensor 62. Of course, as noted earlier, the sensor 62 may be located elsewhere, as desired.

An operational mode of the HUD system 32 can be changed based on a determination of the windshield position. For example, the HUD system 32 can be selectively operated when the windshield 20 is detected or determined to be in or near its home/first position, so that the HUD system 32 is not operated when the windshield 20 is not detected or determined to be in or near the home position. In this way, energy consumption can be reduced, and not useful emissions of light from the display transmitter 34 can be avoided. While described with reference to a movable or removable windshield, the system can be useful in other implementations as well. For example, when a windshield 20 usable with a HUD system 32 is replaced, a new windshield might not include a reflective or other surface and so might not be useable with the HUD system 32. This might be done, for example, to reduce the cost of the new windshield, or for other reasons. In this situation, the sensor 62 may permit detection or determination that the windshield does not include suitable reflective surface 36/display area and HUD system 32 operation can be terminated, and this may be done with a windshield that is fixed in place and not intended to be removed and reinstalled.

Figure 6:
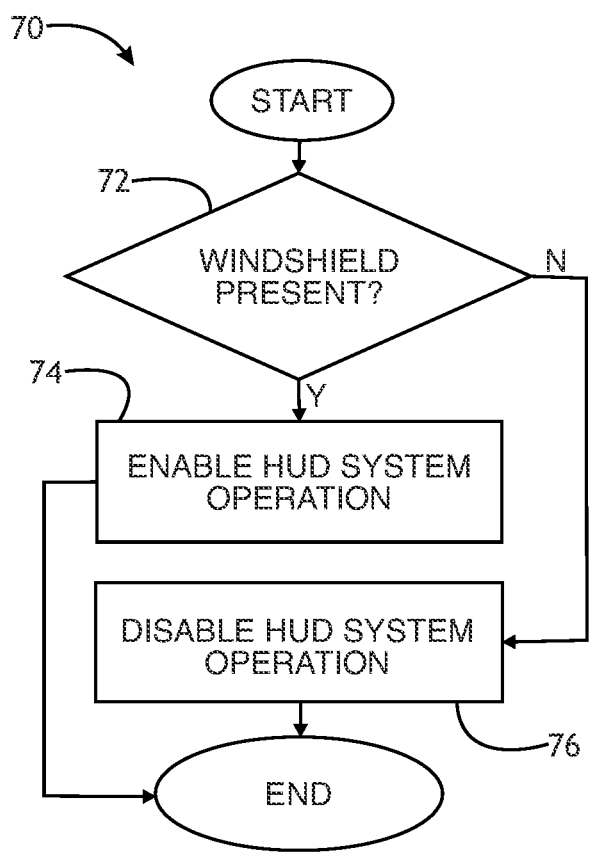
FIG. 6 is a flow chart of a method for selective operation of the HUD system.

A method 70 of controlling a heads-up display in a vehicle 10 is shown in FIG. 6. The method may include step 72 in which it is determined if a windshield 20 is present within a windshield opening 44 of a vehicle 10. If the windshield is detected, then the method continues to step 74 in which operation of the HUD system 32/display transmitter 34 is permitted. If the windshield is not detected in a home position, then the method continues to step 76 and operation of the HUD system32/display transmitter 34 is prevented. The method 70 and the windshield position determinations may be made by querying the sensor 62 at specified intervals or occurrence of one or more events, such as turning on a vehicle ignition, starting a vehicle engine or enabling a motor, for example. The sensor 62 could be operated periodically and provide output to the controller 40 for periodic determination of the presence of the windshield 20 or reflective surface 36.

What is claimed is:

1. A vehicle, comprising:
a windshield;

a display transmitter having an output through which light is emitted onto at least part of the windshield;

a sensor responsive to one or both of a position of the windshield relative to a windshield opening of the vehicle and the presence of a reflective surface that is part of the windshield and onto which light is emitted from the display transmitter; and a controller coupled to the display transmitter and operable to change a mode of the display transmitter when the sensor does not detect the windshield in a home position or when the sensor does not detect the presence of the reflective surface.

2. The vehicle of claim 1 wherein the windshield is movable from a first position in which the windshield covers a windshield opening defined by one or more structural members of the vehicle, and to a second position in which the windshield does not cover the windshield opening.

3. The vehicle of claim 2 wherein the windshield is pivoted to the vehicle and rotated about a pivot axis relative to the vehicle and to and between the first position and the second position.

4. The vehicle of claim 1 wherein the sensor is a switch and wherein the windshield has a first position in which the windshield covers a windshield opening defined by one or more structural members of the vehicle, and wherein the switch is in a first state when the windshield is in the first position and the switch is in a second state when the windshield is not covering the windshield opening.

5. A vehicle, comprising:

a windshield;

a display transmitter having an output through which light is emitted onto at least part of the windshield;

a sensor responsive to one or both of a position of the windshield and the presence of a reflective surface associated with the windshield and onto which light is emitted from the display transmitter; and a controller coupled to the display transmitter and operable to change a mode of the display transmitter when the sensor does not detect the windshield in a home position or when the sensor does not detect the presence of the reflective surface, wherein the sensor is a proximity sensor that detects the presence of the windshield.

6. The vehicle of claim 5 wherein the proximity sensor provides data from which a distance of the windshield from the sensor can be determined.

7. The vehicle of claim 5 wherein the display transmitter is carried by a housing and the proximity sensor is located in or on the housing.

8. The vehicle of claim 6 wherein a characteristic of the emitted light is controlled as a function of the distance.

9. The vehicle of claim 8 wherein the characteristic is a focal length or throw distance of the display transmitter.

10. The vehicle of claim 1 wherein the display transmitter is arranged to emit light onto at least a portion of the reflective surface so that graphics provided by the display transmitter are viewable by a person within the vehicle.

11. The vehicle of claim 5 wherein the proximity sensor emits light or sound and the proximity sensor includes a receiver that received reflections of the light or sound.

12. A method of controlling a heads-up display in a vehicle, comprising:

a) determining the presence of a windshield within a windshield opening of a vehicle, and permitting operation of a display transmitter; or b) determining that the windshield is not present within the windshield opening and then preventing operation of the display transmitter.

13. The method of claim 12 wherein preventing operation of the display transmitter is accomplished by not providing power to the display transmitter.

14. The method of claim 12 wherein determining that a windshield is present or that a windshield is not present is accomplished with a controller and a sensor communicated with the controller, where the sensor is responsive to the position of the windshield.

15. The method of claim 14 wherein the sensor includes an emitter that emits light or sound, and the sensor includes a receiver that receives reflected light or sound to determine the presence of the windshield.

16. The method of claim 14 wherein the controller is coupled to the display transmitter and the controller provides content for display by the display transmitter when the display transmitter is operational.

17. The vehicle of claim 1 wherein the sensor is a proximity sensor that detects the presence of the windshield.

* * * * *